US012778721B2

(12) United States Patent
Park

(10) Patent No.: US 12,778,721 B2
(45) Date of Patent: Nov. 3, 2026

(54) BREAK-RESISTANT REINFORCED IMPLANT STRUCTURE AND METHOD OF MANUFACTURING SAME

(71) Applicant: Tae Seok Park, Seoul (KR)

(72) Inventor: Tae Seok Park, Seoul (KR)

( * ) Notice: Subject to any disclaimer, the term of this patent is extended or adjusted under 35 U.S.C. 154(b) by 275 days.

(21) Appl. No.: 18/257,310

(22) PCT Filed: Jan. 19, 2021

(86) PCT No.: PCT/KR2021/000695
§ 371 (c)(1),
(2) Date: Jun. 14, 2023

(87) PCT Pub. No.: WO2022/131438
PCT Pub. Date: Jun. 23, 2022

(65) Prior Publication Data

US 2024/0033047 A1 Feb. 1, 2024

(30) Foreign Application Priority Data

Dec. 15, 2020 (KR) ........................ 10-2020-0175099

(51) Int. Cl.
*A61C 8/00* (2006.01)
*A61C 13/00* (2006.01)

(52) U.S. Cl.
CPC .......... *A61C 8/0013* (2013.01); *A61C 8/0051* (2013.01); *A61C 8/0059* (2013.01); *A61C 8/006* (2013.01); *A61C 13/0006* (2013.01)

(58) Field of Classification Search
CPC ... A61C 8/0013; A61C 8/0051; A61C 8/0059; A61C 8/006; A61C 8/0012; A61C 8/00;
(Continued)

(56) References Cited

FOREIGN PATENT DOCUMENTS

JP 2010046153 A 3/2010
JP 2015107325 A 6/2015
(Continued)

OTHER PUBLICATIONS

Eom Sang Ho, Zirconia implant fixture, KR-20170069028-A (Year: 2017).*
(Continued)

*Primary Examiner* — Eric J Rosen
*Assistant Examiner* — Mirayda A Aponte
(74) *Attorney, Agent, or Firm* — NKL Law; Jae Youn Kim

(57) ABSTRACT

The present invention relates to: a break-resistant reinforced implant structure which manufactures a fixture and an abutment by a ceramic material having excellent strength and biocompatibility, and reinforcing a preset position into which friction is concentrated during internal and external shock or mutual bond procedure by a predetermined metal to prevent damage in order to compensate for a disadvantage of a ceramic worried about damage due to lack of elasticity; and a method of manufacturing the break-resistant reinforced implant structure. The break-resistant reinforced implant structure comprises: a fixture (10) and an abutment (20) which are formed by a ceramic material integrally or integrally by mutual coupling as individual split type. The fixture (10) and the abutment (20) are stacked therein with a reinforced layer (30) at surfaces or mutual coupling surfaces.

2 Claims, 4 Drawing Sheets

(58) Field of Classification Search
CPC ... A61C 8/005; A61C 8/0048; A61C 13/0006; A61C 13/0003; A61C 13/00
USPC ...................................... 433/174–176, 201.1
See application file for complete search history.

(56) References Cited

FOREIGN PATENT DOCUMENTS

| | | | |
|---|---|---|---|
| KR | 1020120130882 | A | 12/2012 |
| KR | 1020130010533 | A | 1/2013 |
| KR | 1020170069028 | A | 6/2017 |

OTHER PUBLICATIONS

Kuboki et al., Medical Material, WO-2007108411-A1, (Year: 2007).*

カストロ，ダレン，テイ (JP 2005514305 A) (aka Kasutoro et al.), Polycrystalline translucent alumina ceramic material, machine translation (Year: 2005).*

강태인 (KR 200425042 Y1) (aka Gangtaein), implant for a tooth, machine translation (Year: 2006).*

Grundei Hans, Denture for substituting an extracted tooth, EP-0178448-A1, machine translation (Year: 1986).*

* cited by examiner

BREAK-RESISTANT REINFORCED IMPLANT STRUCTURE AND METHOD OF MANUFACTURING SAME

TECHNICAL FIELD

The present invention relates to an implant structure that is configured to allow a plurality of parts made of materials with the similar properties to a natural tooth to be coupledly planted into a patient's alveolar bone to replace the patient's removed tooth, thereby restoring his or her masticatory function, more specifically to a break-resistant reinforced implant structure and a method for manufacturing the same in which a fixture and an abutment are made of a ceramic having excellent strength and biocompatibility, a predetermined position to which internal and external shocks are applied or friction is concentrated in a coupling process between the fixture and the abutment is reinforced with a given metal material so as to compensate for a disadvantage of the ceramic worried about break due to lack of elasticity, and the given metal material has a thread formed thereon so that the thread is prevented from being fractured when the fixture and the abutment are fastened to each other.

BACKGROUND ART

Generally, dental implant surgery is carried out with an implant structure having a fixture planted into a patient's alveolar bone, a crown restored to the same shape with a missing tooth, an abutment for fastening the crown to the fixture, and a coupling member for restricting the crown to the abutment. Usually, the implant structure is made of a metal or ceramic, and desirably, it is made of titanium or zirconia having the similar properties and functions to the natural teeth.

For example, one of implant techniques using a metal is disclosed in Korean Patent Application Laid-open No. 10-2018-0137443 entitled "Titanium implant and method for manufacturing same", and according to the conventional titanium implant, the coupling force of hydroxyapatite to metal is improved and excellent biocompatibility of hydroxyapatite is kept, thereby improving bioactivity and osseointegration.

Most of metals inclusive of titanium have excellent bending performance and break resistance because of their low strength and given elasticity retained therein, but they have relatively lower biocompatibility than a ceramic, particularly zirconia.

Besides, one of implant techniques using a ceramic is disclosed in Korean Patent No. 10-1781087 entitled "Zirconia implant fixture", and the conventional implant fixture, which is fixedly inserted into the alveolar bone, is made of zirconia, while a housing inserted into the fixture or an abutment is being made of titanium, so that a zirconia crown is coupled to the outside of the abutment to thus prevent the titanium abutment from being exposed to the outside. The conventional technique has various advantages, such as reduction of tartar or plague, aesthetic improvement, and the like.

Zirconia is one of the most adequate materials for the implant structure because it has properties, functions, and colors very similar to the natural teeth to enhance the functional and aesthetic performance, while having excellent biocompatibility to raise the healing speed of a patient. However, zirconia has low elasticity despite of having high strength, so that undesirably, it may be damaged or broken only upon application of a given external force thereto, thereby needing an urgent solution.

Therefore, the present invention proposes an implant structure made of zirconia with excellent biocompatibility, while compensating for the lack of elasticity as a disadvantage of zirconia, so that the coupling force of the fixture to the abutment can be improved and the fixture can be prevented from being broken when the coupling occurs.

(Patent Literature 0001) Korean Patent Application Laid-open No. 10-2018-0137443 entitled "Titanium implant and method for manufacturing same"

(Patent Literature 0002) Korean Patent No. 10-1781087 entitled "Zirconia implant fixture"

DISCLOSURE OF THE INVENTION

Technical Problems

Accordingly, the present invention has been made in view of the above-mentioned problems occurring in the related art, and it is an object of the present invention to provide an implant structure that is capable of allowing zirconia with excellent biocompatibility to be free from the disadvantage of low elasticity, thereby improving the quality and safety thereof.

It is another object of the present invention to provide an implant structure that is capable of preventing threads of a fixture and an abutment when the fixture and the abutment are fastened to each other from being fractured if an error in position of engagement therebetween occurs or if an external force applied for such fastening is greater than an allowable value.

It is yet another object of the present invention to provide an implant structure that is capable of allowing the outer surfaces of a fixture coming into direct contact with the alveolar bone and the outer surfaces of a crown coming into direct contact with the gingival to be made of zirconia, thereby facilitating osseointegration because of the biocompatibility of zirconia to substantially reduce a healing time of a patient.

Technical Solutions

To accomplish the above-mentioned objects, a break-resistant reinforced implant structure and a method for manufacturing the same according to the present invention are suggested as follows.

An implant structure (1) according to the present invention may include: a fixture (10) and an abutment (20) made of a ceramic and formed integrally with each other or formed separately from each other and thus integral with each other when coupled; and a reinforcing layer (30) made of a predetermined material and laid onto the surface of the fixture (10) or the abutment (20) or on the coupling surface between the fixture (10) and the abutment (20).

Further, the reinforcing layer (30) may be located on a contact surface (11*a*) as a fastening space of the fixture (10) to the abutment (20), and the predetermined material of the reinforcing layer (30) may be a metal, the reinforcing layer (30) being bonded integrally to the fixture (10) by means of any one method selected from blazing, metalizing, forced fitting, resin bonding, and ceramic bonding.

Further, the fixture (10) may have a friction piece (11*a*-1) protruding flattedly from one side of the contact surface (11*a*), and the reinforcing layer (30) may have a machined surface (31) formed on the outer peripheral surface thereof correspondingly to the friction piece (11*a*-1) to guide an insertion position into the contact surface (11*a*) and restrict a coupling direction to the fixture (10).

Moreover, the fixture (10) may include: a fastening hole (11) concavely formed on top thereof to permit vertical introduction of the abutment (20) thereinto; a plurality of concave grooves 12 machined by a given width downward along the inner periphery of the fastening hole (11) to insert any one bonding material selected from a blazing material, a metalizing material, a resin bond, and a ceramic bond thereinto; and the reinforcing layer (30) bonded integrally to the fastening hole (11) by means of a melted bonding material and having crests formed along the inner periphery thereof and fastened to the abutment (20).

According to the present invention, a method for manufacturing an implant structure may include: a fixture acquiring step (S10) of preparing a fixture (10) made of a ceramic through molding; an abutment acquiring step (S20) of preparing an abutment (20) made of a ceramic or metal through molding; a reinforcing layer acquiring step (S30) of preparing a reinforcing layer (30) through molding, the reinforcing layer (30) having an outer periphery with a given thickness overlaid on the inner periphery of the fixture (10) and a thread formed on the inner periphery thereof; a reinforcing layer bonding step (S40) of forming a recess on the inner periphery of the fixture (10), inserting any one bonding material selected from a blazing material, a metalizing material, a resin bond, and a ceramic bond into the recess, melting the bonding material, and bonding the reinforcing layer (30) to the fixture (10); and a surface treatment step (S50) of performing surface treatments of the fixture (10) and the abutment (20).

Also, the surface treatment step (S50) may be carried out by applying a sanding treatment or an opaque solution to the surfaces of the fixture (10) and the abutment (20) to have given surface roughness.

Additionally, the opaque solution may be a mixture liquid made by mixing 74 to 87% by weight of distilled water, 9 to 18% by weight of a sodium silicate solution, 1 to 2% by weight of ball clay, 1 to 2% by weight of bentonite, 1 to 2% by weight of nanocarbon, and 1 to 2% by weight of titanium powder.

Advantageous Effectiveness of the Invention

According to the present invention, the implant structure is configured to allow the reinforcing layer made of the metal to be overlaid onto the fastening hole of the fixture requiring the highest level of precision and having the load, which is caused by the external force, concentrated thereto in a series of processes of planting the fixture in the patient's alveolar bone, so that the implant structure obtains shock relief based on the elasticity and hardness of the metal, is prevented from being broken under the external force occurring when the reinforcing layer is coupled to the fixture, and acquires coupling force improvement, thereby ensuring the quality and performance thereof and being easy in maintenance thereof.

Further, the implant structure according to the present invention is configured to allow the thread formed on the reinforcing layer to be coupled integrally to the abutment made of the same material as the reinforcing layer, so that the thread is prevented from being fractured when the fixture and the abutment are fastened to each other.

Furthermore, the implant structure according to the present invention is configured to allow the reinforcing layer made of the metal to be hidden between the fixture and the abutment to ensure aesthetic improvement, so that the outer surfaces of the implant structure coming into direct contact with the body region such as the alveolar bone, the gingival, and the like are made of zirconia, thereby facilitating osseointegration because of the biocompatibility of zirconia to substantially reduce a healing time and basically preventing allergic reactions to metal from occurring to ensure simple surgery irrespective of the patient's constitution.

BEST MODE FOR INVENTION

Figure 1:
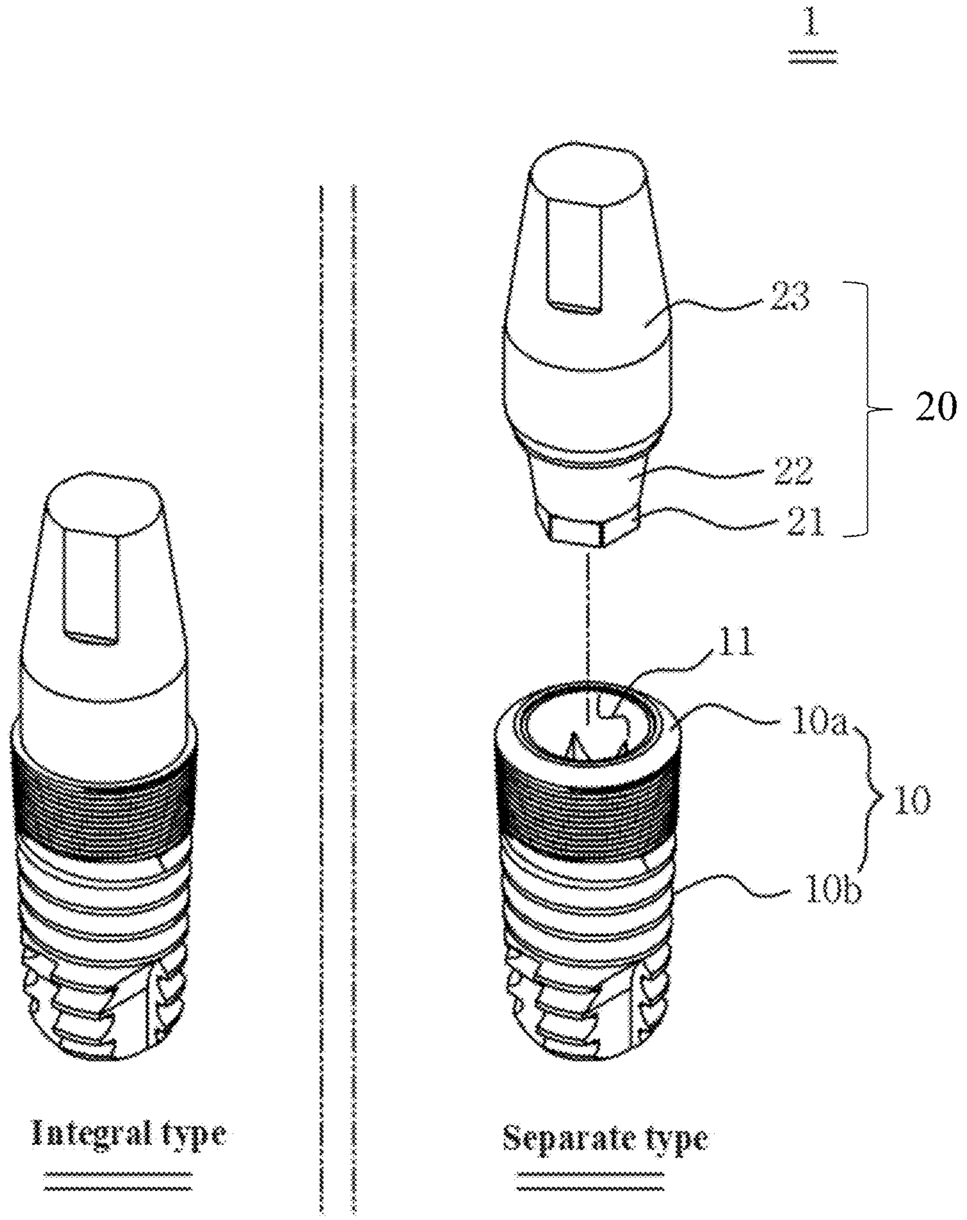
FIG. 1 is a perspective view showing a reinforced implant structure according to a desirable embodiment of the present invention, more specifically an integral type implant structure and a separate type implant structure.

Hereinafter, the configuration, operation, and effectiveness of the present invention will be explained with reference to the attached drawings.

Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. In the description, further, the same reference numerals will be used to describe the same components.

The present invention relates to an implant structure that is configured to configured to allow a plurality of parts made of materials with the similar properties to a natural tooth to be coupledly planted into a patient's alveolar bone and thus replaces the patient's removed tooth, thereby restoring his or her masticatory function.

Above all, the present invention relates to a break-resistant reinforced implant structure and a manufacturing method thereof in which a fixture and an abutment are made of a ceramic having excellent strength and biocompatibility and a predetermined position to which internal and external shocks are applied or friction is concentrated in a coupling process between the fixture and the abutment is reinforced with a given metal material so as to compensate for a disadvantage of the ceramic worried about break due to lack of elasticity, so that the implant structure can be perfectly prevented from being broken.

Figure 2:
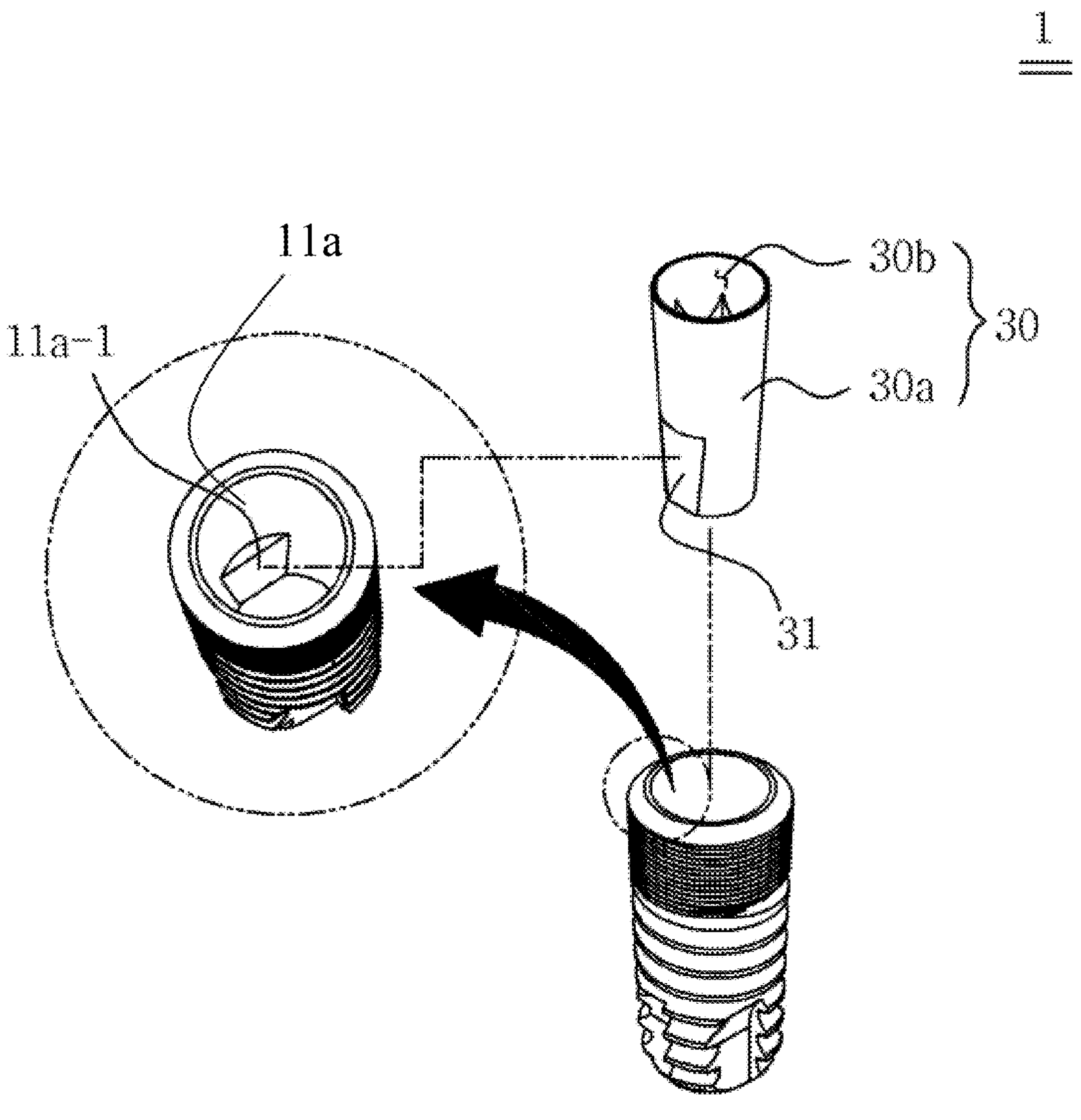
FIG. 2 is an exploded perspective view showing a coupling relation between a fixture and a reinforcing layer according to the present invention.

FIG. 1 is a perspective view showing a reinforced implant structure according to a desirable embodiment of the present invention, more specifically an integral type implant structure and a separate type implant structure, and FIG. 2 is an exploded perspective view showing a coupling relation between a fixture and a reinforcing layer according to the present invention.

As shown in FIG. 1, an implant structure 1 according to the present invention includes a fixture 10 planted into a patient's alveolar bone to provide an installation space for fixedly installing a crown and restriction in position for the installed crown and an abutment 20 serving as a connector for coupling the crown to the fixture 10.

The implant structure 1 may be an integral type implant structure in which the fixture 10 and the abutment 20 are integral with each other as a single body or a separate type implant structure in which the fixture 10 and the abutment 20 are individually separated from each other and thus integral with each other when coupled by a worker.

Further, the fixture 10 and the abutment 20 are made of a metal or ceramic. According to the present invention, it is desirable that the metal be titanium and the ceramic be zirconia.

For example, titanium has relatively lower strength than zirconia, but it has excellent elasticity so that it has high durability with which it can be easily resistant even to a given strong external force. However, disadvantageously, titanium has risk factors for allergic reactions and makes the aesthetics of the implant structure become deteriorated due to its distinctive color.

Zirconia has relatively higher hardness than titanium, but it has low elasticity so that it may be easily broken due to an external force. However, zirconia has the same properties and functions as natural teeth and provides excellent biocompatibility, so that after surgery, it facilitates gingival regeneration. Accordingly, zirconia as an excellent dental material are in the limelight. Unlike titanium, further, zirconia does not have any risk factors for allergic reactions, thereby being freely adopted as a material for dental treatments.

According to the present invention, further, the fixture 10 is made of zirconia, and the abutment 20 is made of titanium or zirconia.

The fixture 10 is planted into a patient's alveolar bone to guide a position at which the implant structure is installed, ensure an installation space for the implant structure, and provide a fastening hole for coupling a crown thereto. The fixture 10 includes a cylindrical body 10*a* with a wide upper part and a narrow lower part, a tap 10*b* spirally cut along the outer periphery of the body 10*a*, and a fastening hole 11 concavely formed on top of the body 10*a* to permit the vertical introduction of the abutment 20 thereinto.

The abutment 20 is a connector for coupling the crown for restoring the missing tooth of the patient to the fixture 10 and serves to set or guide a coupling position, direction, and height of the crown. The abutment 20 includes a seating part 21 inserted into the fastening hole 11 and determined in the coupling direction in the fixture 10 through polygonal surfaces thereof, an entry part 22 extending upward from the seating part 21 and coming into close contact with the inner periphery of the fastening hole 11, and a coupling part 23 extending upward from the entry part 22 to couple the crown thereto.

As mentioned above, the abutment 20 is made of the metal or ceramic, and in specific, the abutment 20 may be made of one selected from titanium and zirconia. For example, it is recommended that the abutment 20 be made of titanium.

The reason why the abutment 20 be made of titanium is because the lower portion of the abutment 20 is inserted into the fixture 10 and the upper portion thereof is fitted to the crown so that the abutment 20 is completely hidden between the fixture 10 and the crown to prevent the surface of titanium from being exposed to the outside. Accordingly, there is no need to worry about the gloss or bad aesthetics of titanium, and since the abutment 20 does not contact with the patient's alveolar bone or gingival, it does not require excellent biocompatibility.

In specific, the abutment 20 is a part to which load is concentrated during the patient's masticatory movements, so that it necessarily requires high durability, and therefore, the abutment 20 is not made of zirconia worried about break, but made of titanium ensuring high durability, thereby being advantageous in safety.

The abutment 20 is integral with the fixture 10 by means of penetrating fastening of a fastening member (not shown) thereto in a state of being insertedly seated into the fastening hole 11 of the fixture 10. Accordingly, the general abutment 20 has a counter bore formed up and down therein to allow the fastening member to gently pass therethrough and be thus seated thereonto, and the fixture 10 has a given tap disposed on the fastening hole 11 to fasten the fastening member thereto.

The fastening member has the shape of a bolt, desirably the shape of a socket head cap screw easily seated onto the counter bore, and in the same manner as the abutment 20, the fastening member is a part to which load is concentrated during the patient's masticatory movements, so that it is made of a metal, thereby ensuring high durability.

Since the fixture 10 is directly planted into the patient's alveolar bone, it is made of ceramic to emphasizedly exert its biocompatibility, and the abutment 20 and the fastening member are made of the metal to emphasizedly exert their firm coupling forces and the break resistance to the masticatory movements.

If the fixture 10 and the abutment 20 or the fixture 10 and the fastening member are made of different materials from each other, the tap of the fixture 10 may be blunt or damaged because of their different physical properties, and in specific, if the tap of the fixture 10 requiring precision machining is damaged, time required for newly manufacturing the fixture and an additional manufacturing cost may be needed.

Therefore, as shown in FIG. 2, the implant structure according to the present invention is configured to allow a reinforcing layer 30 made of a metal to be overlaid onto the fastening hole 11 formed on the fixture 10, so that the tap is formed on the reinforcing layer 30, not on the fixture thereby permitting the abutment 20 and the reinforcing layer 30 made of the same material to be coupled to each other.

The reinforcing layer 30 includes a cylindrical body 30*a* with a wide upper part and a narrow lower part that corresponds to the fastening hole 11 and a coupling hole 30*b* concavely formed on top of the body 30*a* to permit the vertical introduction of the abutment 20 thereinto.

The coupling hole 30*b* has a polygonal groove formed on the upper inner periphery thereof correspondingly to the seating part 21 of the abutment 20 to thus guide the coupling direction of the abutment 20 thereto and prevent the abutment 20 from rotating without permission, and further, the coupling hole 30*b* has a thread formed on the lower inner periphery thereof to couple the fastening member thereto.

Since the reinforcing layer 30 and the abutment 20 are made of the same material as each other, they have the same hardness so that when fastened to each other, they can be prevented from being fractured. For example, if an error in entry or engagement position between the crests and the roots of screws occurs or if an external force applied to fasten the screws to each other is greater than an allowable value to cause the crests to escape from the roots, the crests may be fractured. However, the thread is formed on the reinforcing layer 30 made of the same material as the abutment 20, thereby effectively preventing the crests from being fractured.

Further, as shown in FIG. 2, the fixture 10 has a friction piece 11*a*-1 protruding flattedly from one side of a contact surface 11*a* of the fastening hole 11 with the reinforcing layer 30, and the reinforcing layer 30 has a machined surface 31 formed on the outer peripheral surface thereof correspondingly to the friction piece 11*a*-1.

The reinforcing layer 30 is stably inserted into the fastening hole 11 of the fixture 10 along the slant path of the contact surface 11*a* of the fastening hole 11, and the machined surface 31 formed on the outer peripheral surface of the reinforcing layer 30 engages with the friction piece 11*a*-1 formed on the lower end region of the contact surface 11*a*, so that the installation position of the reinforcing layer 30 is guided and the coupling direction thereof is restricted.

The reinforcing layer 30 is integral with the fixture 10 by means of various bonding in a state of being inserted into the fastening hole 11, and in this case, various bonding includes blazing, metalizing, forced fitting, resin bonding, and ceramic bonding. According to the present invention, the fixture 10 and the reinforcing layer 10 are bonded to each other by means of any one selected from the various bonding.

In specific, the blazing is a welding method for absolutely preventing parts joined from being damaged, which is the most desirable method for bonding dental materials requiring precision, that is, an implant structure. Therefore, blazing is adopted in the desirable embodiment of the present invention, and the blazing is carried out by coating a blazing material onto the contact surface 11*a* or forming a recess on the contact surface 11*a* or the outer periphery of the reinforcing layer 30 to put a blazing material into the recess, melting the blazing material with welding heat, and bonding the fixture 10 to the reinforcing layer 30.

Figure 3:
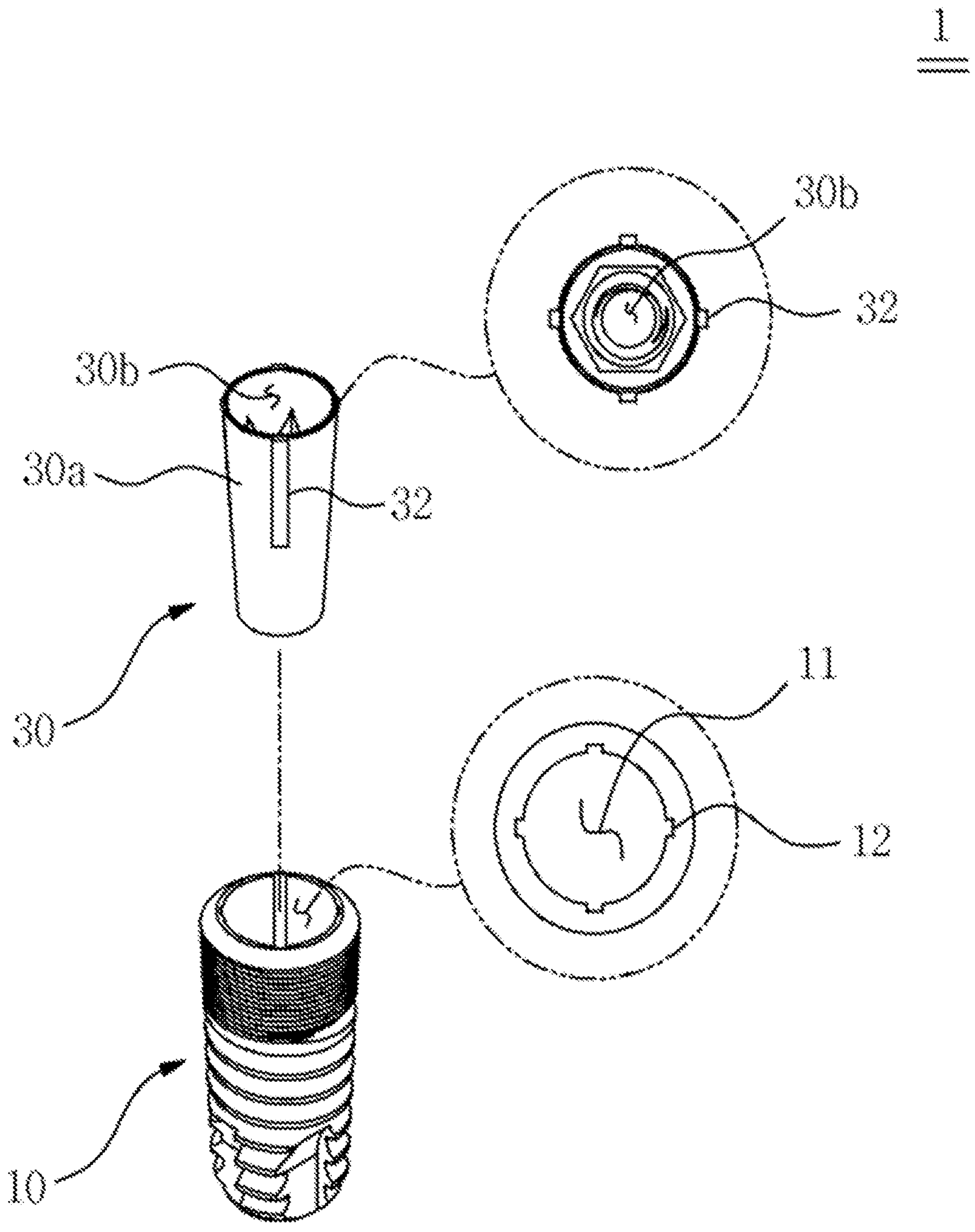
FIG. 3 is an exploded perspective view showing coupling relations between concave grooves of the fixture and protrusions of the reinforcing layer.

FIG. 3 is an exploded perspective view showing concave grooves of the fixture and protrusions of the reinforcing layer and their coupling relation according to another desirable embodiment of the present invention.

As shown in FIG. 3, the fixture 10 has concave grooves 12 machined by a given width downward along the contact surface 11*a* of the fastening hole 11, and the reinforcing layer 30 has protrusions 32 protruding from the outer periphery thereof correspondingly to the concave grooves 12 of the fixture 10.

At least one or more concave grooves 12 are formed in the space permitted by the contact surface 11*a* and insert the protrusions 32 of the reinforcing layer 30 to expand the coupled areas to the reinforcing layer 30, so that the coupling force between the fixture 10 and the reinforcing layer is improved, the rotation without permission of the reinforcing layer 30 is prevented, and the concave grooves 12 are used as the spaces in which a blazing material, metalizing material, resin adhesive, or ceramic adhesive is introduced.

In the same manner as the concave grooves 12, at least one or more protrusions 32 are formed in the range permitted by the outer periphery of the reinforcing layer 30 and thus correspond to the concave grooves 12, thereby allowing the reinforcing layer 30 to be firmly coupled to the fixture 10.

Figure 4:
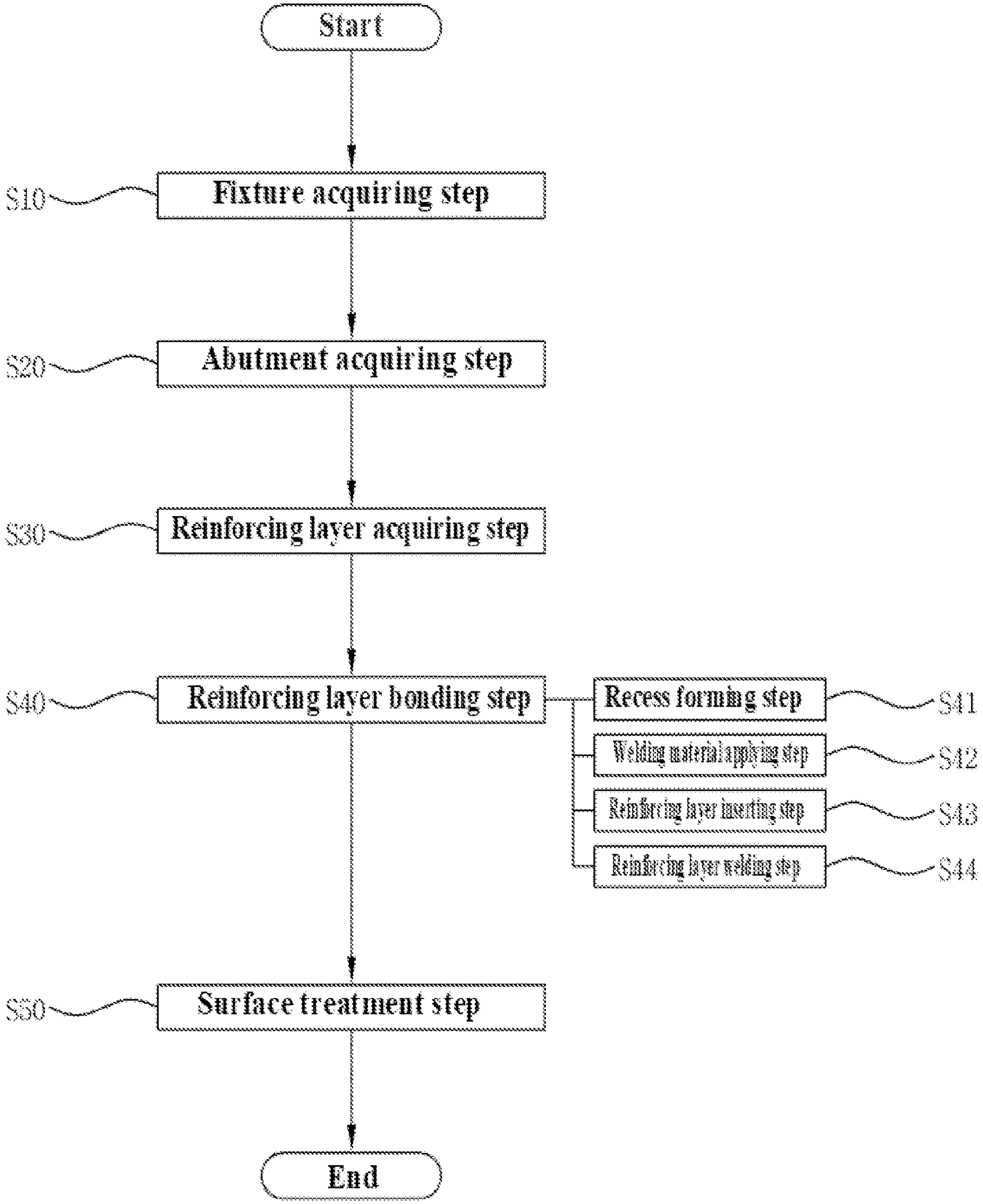
FIG. 4 is a flowchart showing a method for manufacturing a reinforced implant structure according to a desirable embodiment of the present invention.

FIG. 4 is a flowchart showing a method for manufacturing a reinforced implant structure according to a desirable embodiment of the present invention.

As shown in FIG. 4, a method for manufacturing a reinforced implant structure according to the present invention includes: a fixture acquiring step S10 of preparing a fixture 10 made of a ceramic through molding; an abutment acquiring step S20 of preparing an abutment 20 made of a ceramic or metal through molding; a reinforcing layer acquiring step S30 of preparing a reinforcing layer 30 through molding, the reinforcing layer 30 having an outer periphery with a given thickness overlaid on the inner periphery of the fixture 10 and a thread formed on the inner periphery thereof; a reinforcing layer bonding step S40 of forming a recess on the inner periphery of the fixture 10, inserting any one bonding material selected from a blazing material, a metalizing material, a resin adhesive, and a ceramic adhesive into the recess, melting the bonding material, and bonding the reinforcing layer 30 to the fixture 10; and a surface treatment step S50 of performing surface treatments of the fixture 10 and the abutment 20.

The fixture acquiring step S10 is carried out to acquire a zirconia fixture using a Wet Process Cold Isotropic Pressing (Wet CIP) machine. The Wet CIP has a material processing method in which the six sides of a material poured into a mold are pressurized, while inherent properties of the material are being kept well, so that through uniform density and high molding pressure, a molded product is precise in shape and has high durability.

The Wet CIP machine is a device in which powder is introduced into a mold, submerged into a fluid of a molding container, and pressurized against the fluid, so that in a state where top and bottom open ends of the mold are closed with their cap, through the fluid supplied through a pressure port, the powder poured into the mold is subjected to isostatic pressing acting on the mold and thus molded to a predetermined shape. In this case, a pressurizing axial force is applied with a press frame, and after the pressing molding, the fluid is discharged through the pressure port, so that the pressure in the container is reduced to atmospheric pressure, thereby completing the molding.

Further, the mold has a molding part with the corresponding shape to the outer shape of the fixture 10, and in this case, the mold, which is a device in which a part is inserted into a resin and then cured therein, serves to prevent degradation or malfunction from occurring because of moisture or vibrations. In this case, polyester is used as the molding resin. According to the present invention, an elastic mold made of rubber, silicone, or the like is used, which is because it is strong to a temperature, simple to perform precise molding, and easy to detach a molded product after molding. For example, the fixture 10 manufactured according to the present invention is a very important part requiring high precision so that the reinforcing layer 30 is elaborately bonded thereto, and therefore, it is most desirable that the elastic mold with excellent precision machining be used.

The abutment acquiring step S20 and the reinforcing layer acquiring step S30 are carried out to acquire the abutment 20 made of any one of metal and ceramic and the reinforcing layer 30 made of metal using the Wet CIP.

The reinforcing layer bonding step S40 comprises a recess forming step S41 of forming a recess or concave grooves 12 on a contact surface 11*a* of the fixture 10, a welding material applying step S42 of applying a blazing material to the contact surface 11*a* and the recess or concave grooves 12, a reinforcing layer inserting step S43 of inserting the reinforcing layer 30 into a fastening hole 11 of the fixture 10 and allowing the reinforcing layer 30 to come into close contact with the contact surface 11*a*, and a reinforcing layer welding step S44 of applying heat to the blazing material to bond the reinforcing layer 30 to the contact surface 11*a*.

The surface treatment step S50 is carried out to improve the surface of the implant structure 1 to a given state through a surface treatment. For example, a sanding treatment or an opaque solution is applied to the implant structure 1, and next, surface roughness or gloss level control is performed.

For the sanding treatment, the surface of the fixture 10 is subjected to sanding with aluminum oxide $Al_2O_3$ with the sizes of 50 μm at 4 bar pressure and then to impurity removal with injection of a steam cleaner. After the sanding treatment, given roughness is applied to the surface of the fixture 10 to improve the physical coupling force of the fixture 10 to the alveolar bone, and diffused reflection is generated to control the gloss level of the surface of the fixture 10.

For the opaque solution application method, the opaque solution is applied to the surface of the fixture 10, and next, heat treatment is applied to the surface of the fixture 10. In this case, the opaque solution is a mixture liquid made by mixing 74 to 87% by weight of distilled water, 9 to 18% by weight of a sodium silicate solution, 1 to 2% by weight of ball clay, 1 to 2% by weight of bentonite, 1 to 2% by weight of nanocarbon, and 1 to 2% by weight of titanium powder. Because of the color of the opaque solution, diffused reflection is generated from the surface of the fixture 10 to which the opaque solution is applied, thereby controlling the gloss level of the surface of the fixture 10.

As described above, the implant structure according to the present invention is configured to allow the reinforcing layer made of the metal to be overlaid onto the fastening hole of the fixture requiring the highest level of precision and having the load caused by the external force concentrated thereto in a series of processes of planting the fixture in the patient's alveolar bone, so that the implant structure has impact relief based on the elastic force and hardness of the metal material, is prevented from being broken owing to the external force when the reinforcing layer is coupled to the fixture, and strengthens the coupling force, thereby ensuring the quality and performance thereof and being easy in maintenance thereof. Further, the implant structure according to the present invention is configured to allow the abutment made of the same material as the reinforcing layer to be coupled integrally to the crests formed on the reinforcing layer, so that the crests are prevented from being fractured when the fixture and the abutment are fastened to each other. Furthermore, the implant structure according to the present invention is configured to allow the reinforcing layer made of the metal to be hidden between the fixture and the abutment to ensure good outer appearance, so that the outer surfaces of the implant structure coming into direct contact with the body region such as the alveolar bone, the gingival, and the like are made of zirconia, thereby facilitating osseointegration because of the biocompatibility of zirconia to substantially reduce a healing time and basically preventing allergic reactions to metal from occurring to ensure simple surgery irrespective of the patient's constitution.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

EXPLANATIONS OF REFERENCE NUMERALS

| | |
|---|---|
| 10. Fixture | 20. Abutment |

-continued

| | |
|---|---|
| 30. Reinforcing layer | 1. Implant structure |
| S10. Fixture acquiring step | S20. Abutment acquiring step |
| S30. Reinforcing layer acquiring step | S40. Reinforcing layer bonding step |
| S50. Surface treatment step | |

The invention claimed is:

1. A method for manufacturing a break-resistant reinforced implant structure, the method comprising:

a fixture acquiring step of preparing a fixture made of a ceramic through molding, wherein the fixture includes a fastening hole disposed therein and having a contact surface, and wherein the contact surface includes a friction piece protruding from a lower portion thereof or a plurality of concave grooves disposed thereon;

an abutment acquiring step of preparing an abutment made of a ceramic or metal through molding;

a reinforcing layer acquiring step of preparing a reinforcing layer made of a metal material using a Wet Process Cold Isotropic Pressing (Wet CIP), wherein the reinforcing layer includes a recessed-machined surface or a plurality of protrusions disposed on an outer surface thereof;

a reinforcing layer bonding step of:

applying a bonding material selected from a blazing material, a metalizing material, a resin bond, and a ceramic bond on the contact surface of the fastening hole of the fixture;

melting the bonding material;

bonding the reinforcing layer to the fixture so as to enhance an engagement between the fixture and the reinforcing layer; and a surface treatment step of performing surface treatments of the fixture and the abutment, the surface treatment including at least one of a sanding process or application of an opaque coating solution.

2. A break-resistant reinforced implant structure, comprising:

a fixture made of a ceramic;

an abutment made of the ceramic, the abutment being separated from the fixture and configured to be coupled to the fixture to be integral therewith; and a reinforcing layer made of a metal and configured to be integrally bonded to the fixture, wherein the reinforcing layer includes:

a body having an upper portion and a lower portion, wherein the upper portion is wider than the lower portion, the body being tapered such that an outer diameter of the body gradually decreases from the upper portion toward the lower portion;

a coupling hole disposed in the upper portion of the body; and a plurality of protrusions disposed on an outer surface of the body, wherein the fixture includes:

a fastening hole having a contact surface; and a plurality of concave grooves disposed on the contact surface of the fastening hole and configured to be engaged with the plurality of protrusions, wherein the plurality of concave grooves are disposed downwardly along the contact surface, each of the plurality of concave grooves having a given width, thereby expanding a coupled area between the fixture and the reinforcing layer to improve a coupling force, wherein each of the plurality of concave grooves defines a space into which a bonding material is introduced, wherein the plurality of protrusions protrude from the outer surface of the body and each correspondingly engages a respective one of the plurality of concave grooves, and wherein engagement between the plurality of protrusions and the plurality of concave grooves guides an insertion alignment of the reinforcing layer into the fastening hole and restricts rotational movement of the reinforcing layer.

* * * * *